US012633747B2

(12) United States Patent
Kasicheyanula et al.

(10) Patent No.: US 12,633,747 B2
(45) Date of Patent: May 19, 2026

(54) POWER CONVERTER SYSTEM WITH MULTIPLE ISOLATED DC LOAD PORTS

(71) Applicant: Delta Electronics India Private Limited, Gurugram (IN)

(72) Inventors: Saichand Kasicheyanula, Gurugram (IN); Shashidhar Mathapati, Gurugram (IN)

(73) Assignee: Delta Electronics India Private Limited, Gurugram (IN)

( * ) Notice: Subject to any disclaimer, the term of this patent is extended or adjusted under 35 U.S.C. 154(b) by 226 days.

(21) Appl. No.: 18/638,599

(22) Filed: Apr. 17, 2024

(65) Prior Publication Data

US 2024/0356333 A1 Oct. 24, 2024

(30) Foreign Application Priority Data

Apr. 18, 2023 (IN) .............................. 202311028243

(51) Int. Cl.
| | |
|---|---|
| *H02J 3/14* | (2026.01) |
| *H02J 3/46* | (2006.01) |
| *H02M 1/00* | (2006.01) |
| *H02M 7/217* | (2006.01) |
| *H02M 7/219* | (2006.01) |

(52) U.S. Cl.
CPC ................ *H02J 3/144* (2020.01); *H02J 3/46* (2013.01); *H02M 1/0067* (2021.05); *H02M 7/217* (2013.01); *H02M 7/219* (2013.01)

(58) Field of Classification Search
CPC .......... H02J 3/144; H02J 3/46; H02M 1/0067; H02M 7/217; H02M 7/219
See application file for complete search history.

(56) References Cited

U.S. PATENT DOCUMENTS

| | | | |
|---|---|---|---|
| 10,811,988 B2 | 10/2020 | Keister et al. | |
| 10,944,338 B2 | 3/2021 | Huang et al. | |
| 11,811,310 B2 * | 11/2023 | Lu ........................... | B60L 53/22 |

(Continued)

FOREIGN PATENT DOCUMENTS

| | | |
|---|---|---|
| CN | 103248232 B | 4/2015 |
| CN | 105591548 A | 5/2016 |

(Continued)

*Primary Examiner* — Rafael O De Leon Domenech
(74) *Attorney, Agent, or Firm* — KIRTON McCONKIE; Evan R. Witt

(57) ABSTRACT

A power converter system includes a plurality of AC-DC-HFAC modules configured to generate HFAC voltages from the AC voltage received from a power source. The power converter system further includes a plurality of multi-winding high frequency transformers (HFTs) including primary windings and secondary windings. Each secondary winding of the plurality of multi-winding HFTs coupled to the plurality of AC-DC-HFAC modules generates an HFAC voltage port. Further, the power converter system includes one or more HFAC-DC modules coupled to a corresponding secondary winding of the plurality of multi-winding HFTs, thereby generating isolated DC load ports. The plurality of multi-winding HFTs is operated based on a phase angle control technique for enabling power transmission between the primary windings to each of the secondary windings based on the load demand, thereby providing DC power supply to loads.

15 Claims, 16 Drawing Sheets

(56)                References Cited

U.S. PATENT DOCUMENTS

| | | | | |
|---|---|---|---|---|
| 2008/0198637 | A1* | 8/2008 | Meysenc ............... | H02M 7/219 |
| | | | | 363/67 |
| 2009/0315393 | A1* | 12/2009 | Yeh .......................... | B60L 1/00 |
| | | | | 307/10.1 |
| 2021/0061114 | A1* | 3/2021 | Sun .......................... | H02J 7/02 |
| 2022/0158549 | A1 | 5/2022 | Lu et al. | |
| 2022/0329173 | A1* | 10/2022 | Cheng ................... | H02M 5/458 |
| 2023/0081157 | A1* | 3/2023 | Duan .................. | H02M 1/0048 |
| | | | | 363/17 |

FOREIGN PATENT DOCUMENTS

| | | | |
|---|---|---|---|
| CN | 103516230 | B | 8/2016 |
| CN | 107733244 | B | 12/2019 |
| CN | 110829845 | A | 2/2020 |
| CN | 112217234 | A | 1/2021 |
| CN | 112653203 | A | 4/2021 |
| CN | 113726180 | A | 11/2021 |
| CN | 114223127 | A | 3/2022 |
| CN | 114512977 | A | 5/2022 |
| CN | 109301813 | B | 7/2022 |
| CN | 115051351 | A | 9/2022 |
| EP | 3985821 | A1 | 4/2022 |
| WO | 2020091168 | A1 | 5/2020 |

* cited by examiner

POWER CONVERTER SYSTEM WITH MULTIPLE ISOLATED DC LOAD PORTS

CROSS-REFERENCE TO RELATED APPLICATION

This application claims priority to India patent application No. 202311028243 filed on Apr. 18, 2023. The entire contents of the above-mentioned patent application are incorporated herein by reference for all purposes.

FIELD OF THE INVENTION

The present disclosure generally relates to power converter systems, and more particularly relates to multi-winding high-frequency transformers-based power converter systems with multiple isolated low voltage direct current (DC) ports.

BACKGROUND OF THE INVENTION

In recent times, there has been increased integration of renewable and energy storage devices to an alternating current (AC) grid. To that effect, there is a sharp increase in connected direct current (DC) systems such as electrical vehicles (EVs) and energy storage devices, etc. In existing art, there are several systems with power electronic topology for providing power supply to multiple DC systems from a power grid.

One such power electronic topology is the usage of an intermediate medium voltage DC bus (as shown in FIG. 1). This topology includes a two-stage configuration that involves a non-isolated medium voltage AC (MVAC)-medium voltage DC (MVDC) converter stage followed by an MVDC-isolated low voltage DC (LVDC) converter stage (as shown in FIG. 1). In this configuration, MVDC from MVAC can be generated either using a modular multilevel converter (MMC) or using traditional AC-DC converters based on medium voltage (MV) semiconductor devices. This configuration can be further extended to generate an HFAC-intermediate port (as shown in FIG. 2). As shown in FIG. 2, the MVDC-HFAC converter stage generates HFAC voltages that are accessed by several High-Frequency Transformers (HFTs) catering to multiple DC loads. Further, filter capacitors and blocking capacitors are utilized to block medium voltage DC and to support the HFTs in this configuration, respectively. In this configuration, the current output of HFAC terminals is very high, since a single MVDC-HFAC converter stage handles the total power requirement of all the DC load ports.

However, the topology disclosed in FIGS. 1 and 2 reduce efficiency due to the utilization of multiple isolated DC-DC conversion stages. Additionally, if MV semiconductor devices are utilized, it reduces the reliability and EMI performance of the MVAC-MVDC converter. Further, if MMC based topologies (as shown in FIGS. 1 and 2) are considered for MVAC-MVDC conversion, the Basic Insulation Level (BIL) requirements of the system also increase. The capacitor sizing of the MVDC bus is also bulkier resulting in separate voltage balancing controller requirements which increases the overall unit cost. Moreover, due to the utilization of intermediate MVDC bus, a high switch count may be required, thus resulting in higher power electronic stack costs which also reduces the operational reliability of the system.

Another power electronic topology is a cascaded H-bridge (CHB) based Input Series Output Parallel (ISOP) configuration (as shown in FIG. 3). In particular, the CHB-ISOP configuration defined for a single LVDC port extended to multiple ports is shown in FIG. 3. To generate multiple isolated LVDCs, the CHB-ISOP configuration is utilized as it is cost-effective. It is to be noted that multiple non-isolated LVDC ports are utilized to generate an isolated LVDC port. Moreover, the operating BIL levels of the system is improved as compared to the topologies discussed above. However, the isolated DC-DC conversion stages on a single LVDC bus to generate multiple isolated LVDCs increases the number of isolation stages which reduces the overall efficiency. The efficiency of the system is further decreased if power transfer occurs between the two load ports due to the increased number of isolation stages. In order to improve the efficiency in this configuration, the intermediate LVDC port can be eliminated which reduces the number of isolation stages. Although the efficiency is improved, the power imbalance in the load ports reflects AC power imbalances between CHB modules.

Further, in another topology, a dedicated port (third port) with a high-frequency transformer (HFT) unit on every series connected MVAC-LVDC conversion unit may be utilized to handle power imbalance between load ports. As a result, the efficiency is reduced due to multiple power conversion stages to handle load port imbalances, the cost increases and reduces power density.

In yet another topology, an auxiliary winding corresponding to a main secondary winding can be utilized on each HFT to handle power imbalance between load ports. In this configuration, an external impedance is utilized for controlling energy exchange. This results in a higher kVA rating and cost of the transformer unit for the same load kVA rating. Moreover, efficiency is also affected due to additional losses in the external impedance to handle load port imbalances.

In yet another topology, the auxiliary winding along with a power conversion stage may be utilized on the HFT to store/release the imbalance load power using energy storage. In this scenario, the energy storage acts as a medium to address the power imbalance between load ports. This results in a higher kVA rating and cost of the HFT for the same load kVA rating, increased sizing, and thus reduced power density per load kVA. Further, the control associated with this topology is complicated due to additional conversion stages and energy storage.

Therefore, there is a need for an improved and efficient power electronic topology for generating multiple LVDC ports, in order to overcome the aforementioned limitations.

SUMMARY OF THE INVENTION

The main objective of the present invention is to provide a Multiport Solid-State Transformer (MP-SST) which converts power from a power source to multiple isolated low-voltage direct current (LVDC) ports.

An aspect of the present invention is to address at least the above-mentioned problems and/or disadvantages and to provide at least the advantages described below.

Accordingly, in one aspect of the present disclosure, a power converter system is disclosed. The power converter system includes a plurality of alternating current (AC)-direct current (DC)-high frequency alternating current (HFAC) modules coupled to power sources. Further, the plurality of AC-DC-HFAC modules are configured to generate HFAC voltages from the AC voltage received from the power source. The power converter system includes a plurality of multi-winding high frequency transformers (HFTs). The plurality of multi-winding HFTs includes primary windings and secondary windings. The plurality of multi-winding HFTs are insulated with optimum graded insulation and are adapted to receive the HFAC voltages from the plurality of AC-DC-HFAC modules. Each secondary winding of the plurality of multi-winding HFTs coupled to the plurality of AC-DC-HFAC modules generates an HFAC voltage port. Further, the power converter system includes one or more HFAC-DC modules. Each of the one or more HFAC-DC modules is coupled to a corresponding secondary winding of the plurality of multi-winding HFTs, thereby generating isolated DC load ports. The plurality of multi-winding HFTs is operated based on a phase angle control technique for enabling power transmission between the primary windings to each of the secondary windings based on the load demand associated with the corresponding isolated DC load ports, thereby providing DC power supply to loads connected to the isolated DC load ports via the corresponding HFAC-DC modules of the one or more HFAC-DC modules.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference features and modules.

Figure 1:
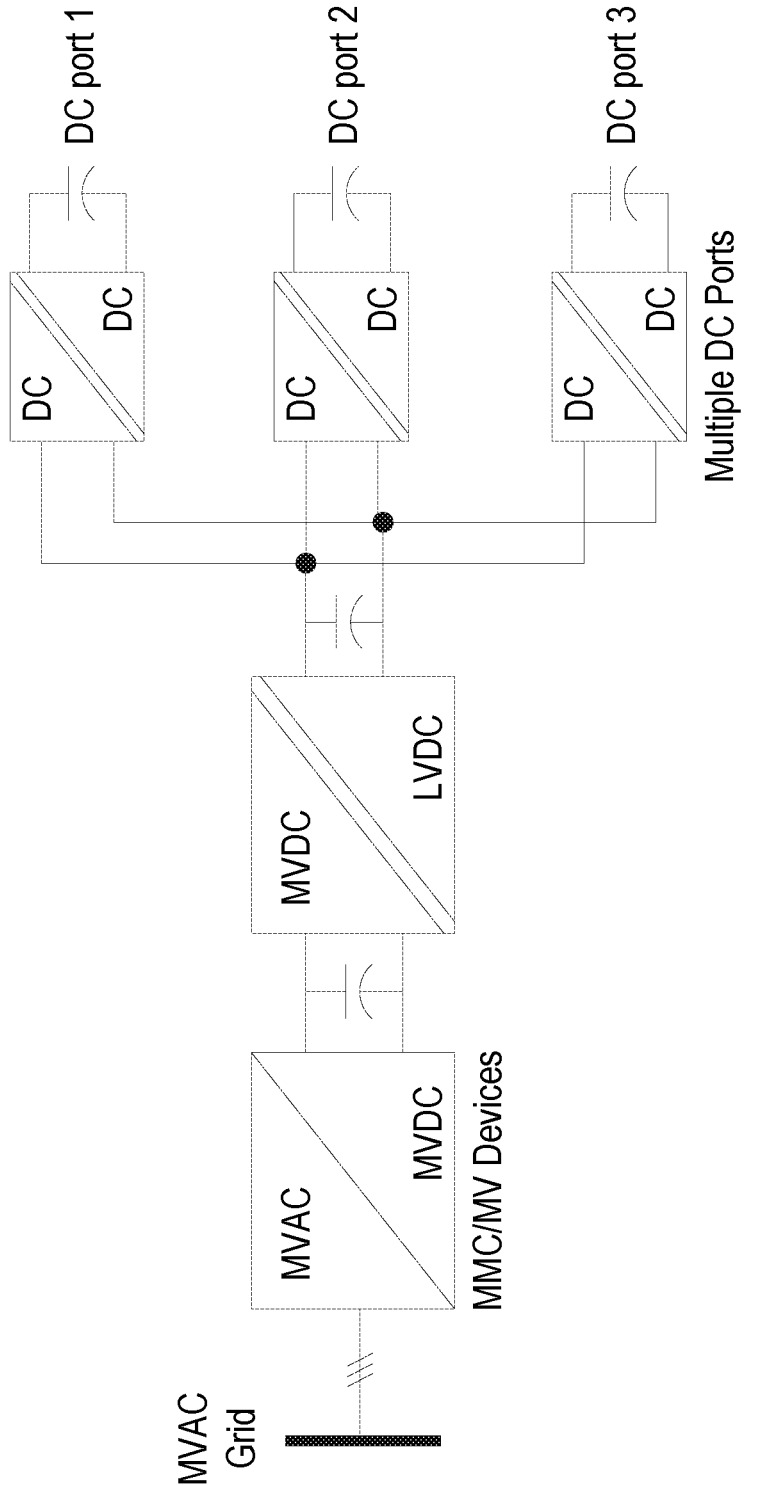
FIGS. 1, 2, and 3 illustrate a simplified block diagram representation of conventional power electronic topologies in which DC load ports are realized.

It should be appreciated by those skilled in the art that any block diagrams herein represent conceptual views of illustrative methods embodying the principles of the present disclosure. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF THE PREFERRED EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. References in the specification to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figures discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

In the following description, for purpose of explanation, specific details are set forth in order to provide an understanding of the present disclosure. It will be apparent, however, to one skilled in the art that the present disclosure may be practiced without these details. One skilled in the art will recognize that embodiments of the present disclosure, some of which are described below, may be incorporated into a number of systems. However, the systems and methods are not limited to the specific embodiments described herein. Further, structures and devices shown in the figures are illustrative of exemplary embodiments of the presently disclosure and are meant to avoid obscuring of the presently disclosure.

Various embodiments of the present disclosure are further described with reference to FIG. 4 to FIGS. 11A-11E.

Figure 2:
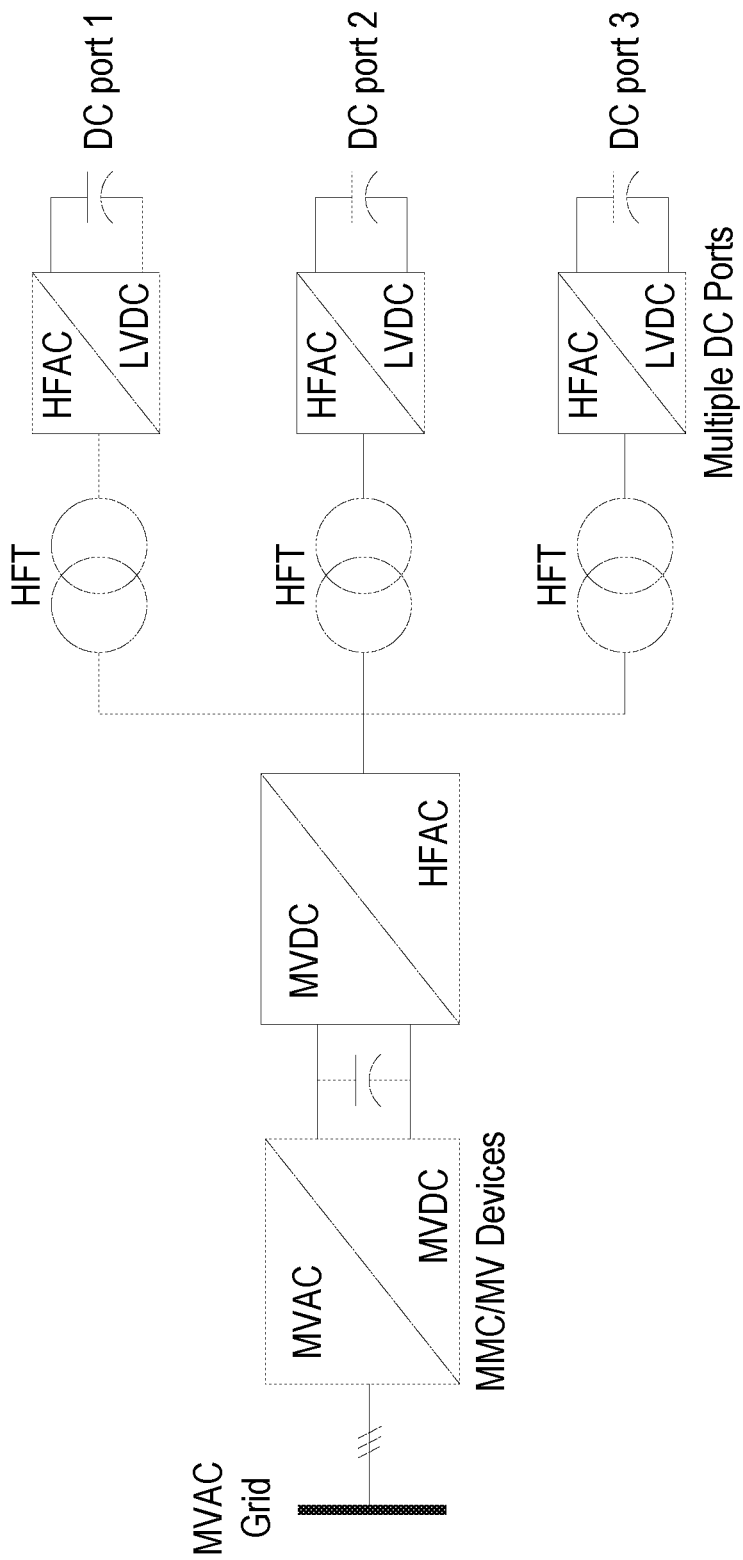
Figure 3:
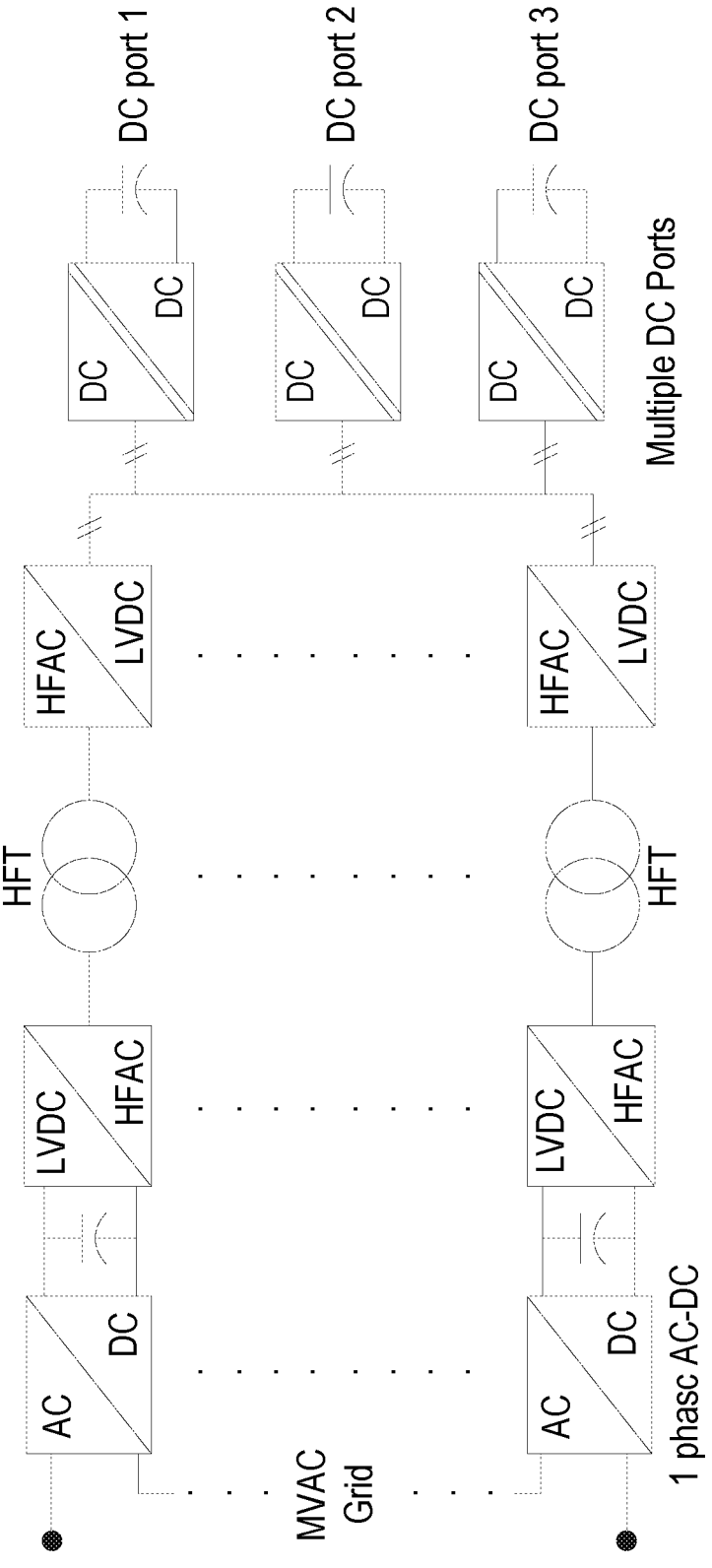
Figure 4:
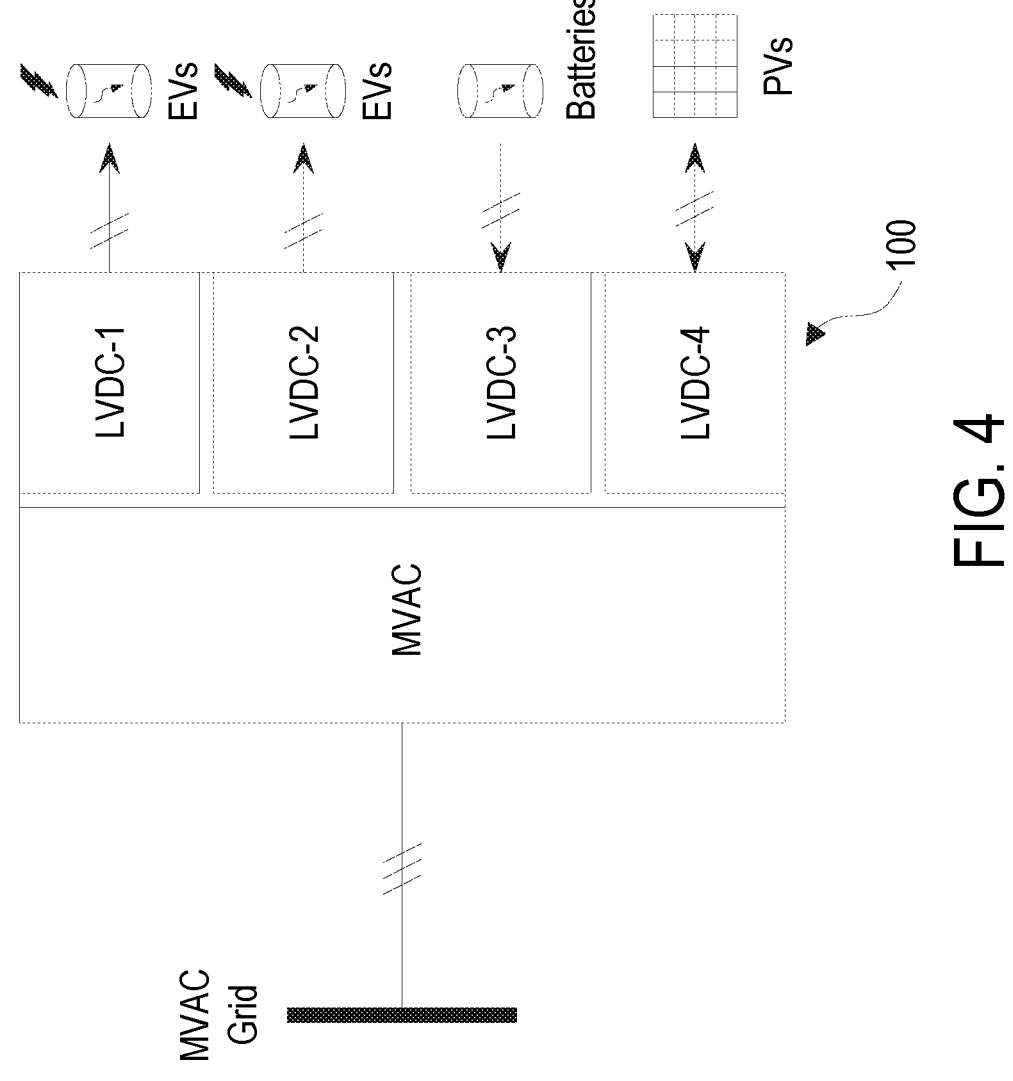
FIG. 4 illustrates a simplified block diagram representation of a power converter system with multiple isolated DC load ports, in accordance with an embodiment of the present disclosure.

FIG. 4 illustrates a simplified block diagram representation of a power converter system (100) with multiple isolated DC load ports, in accordance with an embodiment of the present disclosure. The power converter system (100) is based on a Cascaded H-bridge (CHB) multi-level converter. The power converter system (100) is configured to convert medium voltage alternating current (MVAC) to multiple isolated low voltage direct current (LVDCs) ports which addresses the above listed challenges/limitations associated with the topologies explained with references to FIGS. 1-3. Additionally, or alternatively, the power converter system (100) may be implemented for various voltage levels or power grids for generating isolated DC ports, therefore it should not be taken to limit the scope of the present disclosure. In the current industry, the abovementioned low voltage though exact numbers vary from country to country typically may indicate several hundreds of volts, the abovementioned medium voltage typically may indicate several kV, kilovoltage. For example, according to current Indian grid codes, medium voltage may refer to from 1 kV to 35 kV, and high voltage may refer to more than 35 kV. The low voltage and the medium voltage may also be relative terms which may also be rough distinctions conventionally used in the industry. The exact boundaries of high/low is ambiguous and may vary with operating scenario and specific country's electrical systems. It should be apparent to those skilled in the art that the above description of the terms are provided for illustration purposes only, and it should not be taken to limit the scope of the present disclosure.

The power converter system (100) includes multi-winding high frequency transformers (HFTs) with multiple secondary windings. Further, all the secondary windings are connected in a parallel configuration, prior to feeding corresponding load side high-frequency alternating current (HFAC)-direct current (DC) converters. This results in improved efficiency and power density, which will be explained further in detail. In the embodiment, the mentioned high frequency in power electronics domain typically may indicate several tens-hundreds of kHz. The exact boundaries of high/low is ambiguous and may vary with operating scenario and specific country's electrical systems. It should be apparent to those skilled in the art that the above description of the terms are provided for illustration purpose only, and it should not be taken to limit the scope of the present disclosure.

Figure 5:
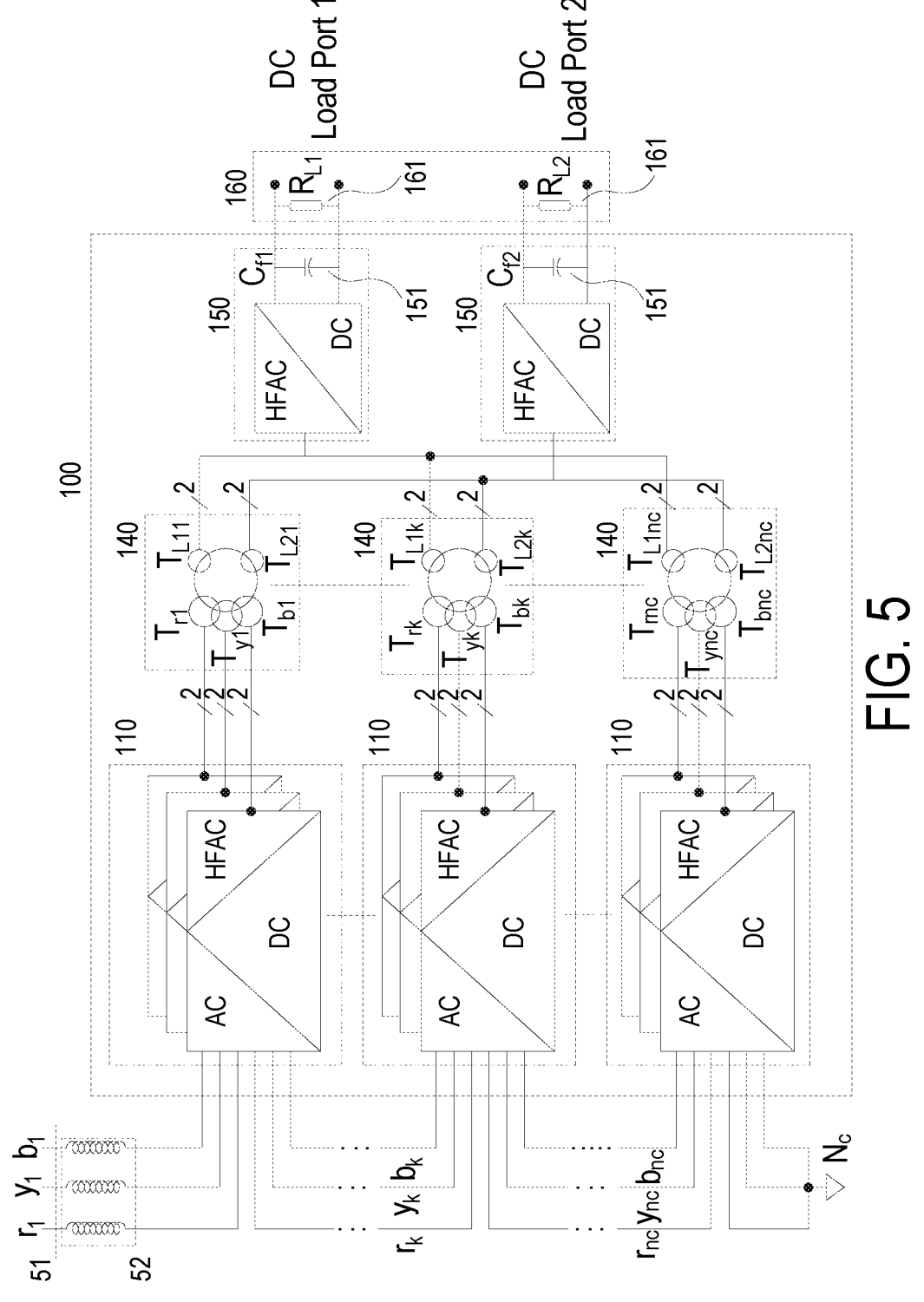
FIG. 5 illustrates a simplified block diagram representation of the power converter system including one or more operating modules, in accordance with an embodiment of the present disclosure.

FIG. 5 illustrates a simplified block diagram representation of the power converter system (100) including one or more operating modules, in accordance with an embodiment of the present disclosure. Although the power converter system (100) is depicted to include one or a few components, modules, or devices arranged in a particular arrangement in the present disclosure, it should not be taken to limit the scope of the present disclosure. In one example, the power converter system (100) may be a star connected medium voltage CHB converter. Further, the modules or the operating blocks of the power converter system (100), in general, correspond to CHB modules. As explained above, the power converter system (100) is configured to generate multiple isolated LVDC ports (i.e., multiple isolated DC load ports 160) from a power source (51).

The power converter system (100) includes a plurality of alternating current (AC)-direct current (DC)-high frequency alternating current (HFAC) modules (110). Each AC-DC-HFAC module of the plurality of AC-DC-HFAC modules (110) is operatively coupled to the power source (51). In the present disclosure, the power source (51) is represented as power grid. In an embodiment, the power grid is a medium voltage (MV) power grid. Further, each of the AC-DC-HFAC modules (110) is configured to generate HFAC voltages from phase voltages of the power grid. The MV power grid includes three phases (i.e., R-phase, Y-phase, and B-phase). Thus, the three-phase voltages are transmitted to the corresponding AC-DC-HFAC modules (110). To that effect, the AC-DC-HFAC modules (110) generate the HFAC voltages from the three-phase voltages from the power grid.

Figure 6A:
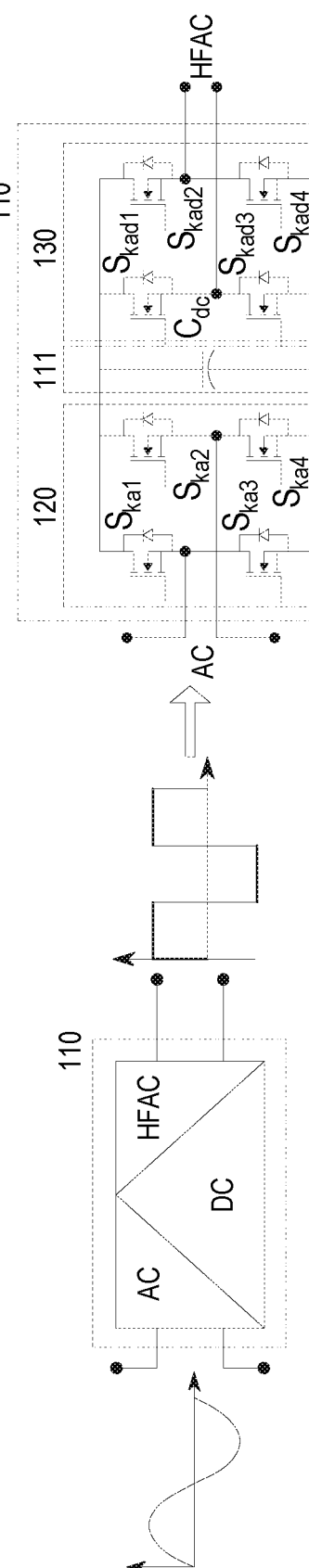
FIG. 6A illustrates a block diagram representation of internal components of an AC-DC-HFAC module of the power converter system of FIG. 5, in accordance with an embodiment of the present disclosure.

Referring to FIG. 6A in conjunction with FIG. 5, each AC-DC-HFAC module (110) includes an AC-DC power converter (120), a DC bus capacitance (111), and a DC-HFAC converter (130). It is to be noted that the block diagram of the AC-DC-HFAC module (110) shown in FIG. 6A, is a single module that is fed by the power source (51).

The power converter system (100) (i.e., CHB converter) includes '$n_c$' number of AC-DC power converters (120) per phase. Further, several such blocks connected in series on the AC side (i.e., the power source (51)) for voltage sharing constitute the star connected CHB converter (i.e., the power converter system (100)). In other words, the AC-DC power converter (120) of each of the plurality of AC-DC-HFAC modules (110) is coupled in a series configuration and further connected to the power source (51). The AC-DC power converter (120) is configured to operate based on a first switching frequency ($f_{sw1}$) to regulate DC voltage from the phase voltages of the power source (51). In other words, the semiconductor switches (not shown in figures) in the H-bridge of the AC-DC power converter (120) switch at the first switching frequency ($f_{sw1}$). Further, the AC voltages applied on each AC-DC-HFAC module (110) is represented using the following equation (Eq. 1).

$$V_{acmod} = \frac{V_g}{n_c\sqrt{3}} \quad \text{(Eq. 1)}$$

Wherein, $V_{acmod}$ is the AC voltage to the AC-DC-HFAC module (110),

Vg is the applied three-phase voltage from the power source (51), and

'$n_c$' is the number of AC-DC power converters (120) connected in series.

Further, each AC-DC power converter (120) is controlled and modulated to at least regulate the DC voltage at DC bus capacitance (111) (i.e., capacitor Cdc) and achieve the required input power factor by shaping the AC side current through a three-phase inductor (52). In one scenario, if 'P_L' is the nominal power demand of each isolated DC load port (160), and the number of load ports is 'n_L', then power handled by each AC-DC power converter (120) for three-phase operation, is expressed using the following equation (Eq. 2).

$$P_{chb} = \frac{n_L P_L}{3n_c} \qquad \text{(Eq. 2)}$$

Wherein, $P_{chb}$ represents the power handled by the AC-DC power converter (120).

Thereafter, the regulated DC from each AC-DC power converter (120) is applied onto the terminals of the DC-HFAC converter (130). The DC-HFAC converter (130) is configured to operate based on a second switching frequency ($f_{sw2}$). In other words, the DC-HFAC converter (130) includes an H-bridge that switches at the second switching frequency ($f_{sw2}$). The DC-HFAC converter (130) generates the HFAC voltages of constant phase difference from the regulated DC voltage received from each AC-DC power converter (120) via the DC bus capacitance (111). It is to be noted that the second switching frequency ($f_{sw2}$) is set greater than the first switching frequency ($f_{sw1}$) due to multi-level operation associated with the power converter system (100). In particular, due to series connection of AC-DC power converter (120) to the power source (51), the modulation of these series connected AC-DC power converter (120) is controlled in such a way that, though the individual AC-DC power converter's switching frequency is $f_{sw1}$, the effective switching frequency of the total power converter system connected to power source is close to $f_{sw2}$. This is due to the multi-level operation associated with the power converter system (100). Further, the typical voltage waveforms at input terminal of AC-DC power converter (120) and output terminal of DC-HFAC converter (130) are shown in FIG. 6A. It should be noted that for each level, three such modules exist corresponding to three phases, resulting in three HFAC voltages. Similarly, the power handled by the DC-HFAC converter (130) is equal to the power handled by the AC-DC power converter (120). Specifically, the power handled by the DC-HFAC converter (130) is equal to $P_{chb}$ expressed in equation (Eq. 2).

Referring to FIG. 5, the power converter system (100) includes a plurality of multi-winding high frequency transformers (HFTs) (140). The multi-winding HFT (140) includes primary windings and secondary windings. The multi-winding HFTs (140) are insulated with optimum graded insulation and receives the HFAC voltages from the plurality of AC-DC-HFAC modules (110).

The primary windings may be selected based on a number of phases associated with the power source (51). For example, the windings $T_{rk}$, $T_{yk}$, $T_{bk}$ are the primary windings of the multi-winding HFTs (140) corresponding to HFAC voltages from three phases, and the windings $T_{L1k}$, $T_{L2k}$ are the secondary windings for the $k^{th}$ module (or the multi-winding HFT (140)). The number of isolated DC load ports (160) is directly proportional to number of secondary windings in the plurality of multi-winding HFTs (140). Further, the secondary windings from each of the multi-winding HFTs (140) transmit power to their corresponding isolated DC load port (160). For example, there may be 'n_L' number of isolated DC load ports (160), thus n_L+3 windings are provided to each of the multi-winding HFTs (140).

Further, the corresponding secondary windings of each of the plurality of multi-winding HFTs (140) are connected in a parallel configuration which in turn is coupled to the plurality of AC-DC-HFAC modules (110) for generating an HFAC voltage port. The HFAC voltage port corresponds to an intermediate HFAC port that is generated at the multi-winding HFTs (140) which includes three primary windings and multiple secondary windings as explained above. Further, the secondary windings connected in the parallel configuration prevent interruption in the power supply to the isolated DC load ports (160).

The plurality of multi-winding HFTs (140) is operated based on a phase angle control technique for enabling power transmission between the primary windings to each of the secondary windings. In other words, the power transfer between the three primary windings and each of the secondary windings in the HFTs (140) is controlled by the phase difference between the primary windings and each of the secondary windings. The power rating of each of the multi-winding HFTs (140) is expressed using the following equation (Eq. 3).

$$P_{HFT} = \frac{n_L P_L}{n_c} \qquad \text{(Eq. 3)}$$

Wherein, $P_{HFT}$ represents the power rating of the multi-winding HFT (140).

Further, the power handled by each primary winding and the secondary windings in the multi-winding HFTs (140) is expressed using the following equations.

$$P_{pri} = \frac{n_L P_L}{3n_c} \qquad \text{(Eq. 4)}$$

$$P_{sec} = \frac{P_L}{n_c} \qquad \text{(Eq. 5)}$$

Wherein, $P_{pri}$ represents the power handled by primary windings, and $P_{sec}$ represents the power handled by secondary windings.

Figure 7:
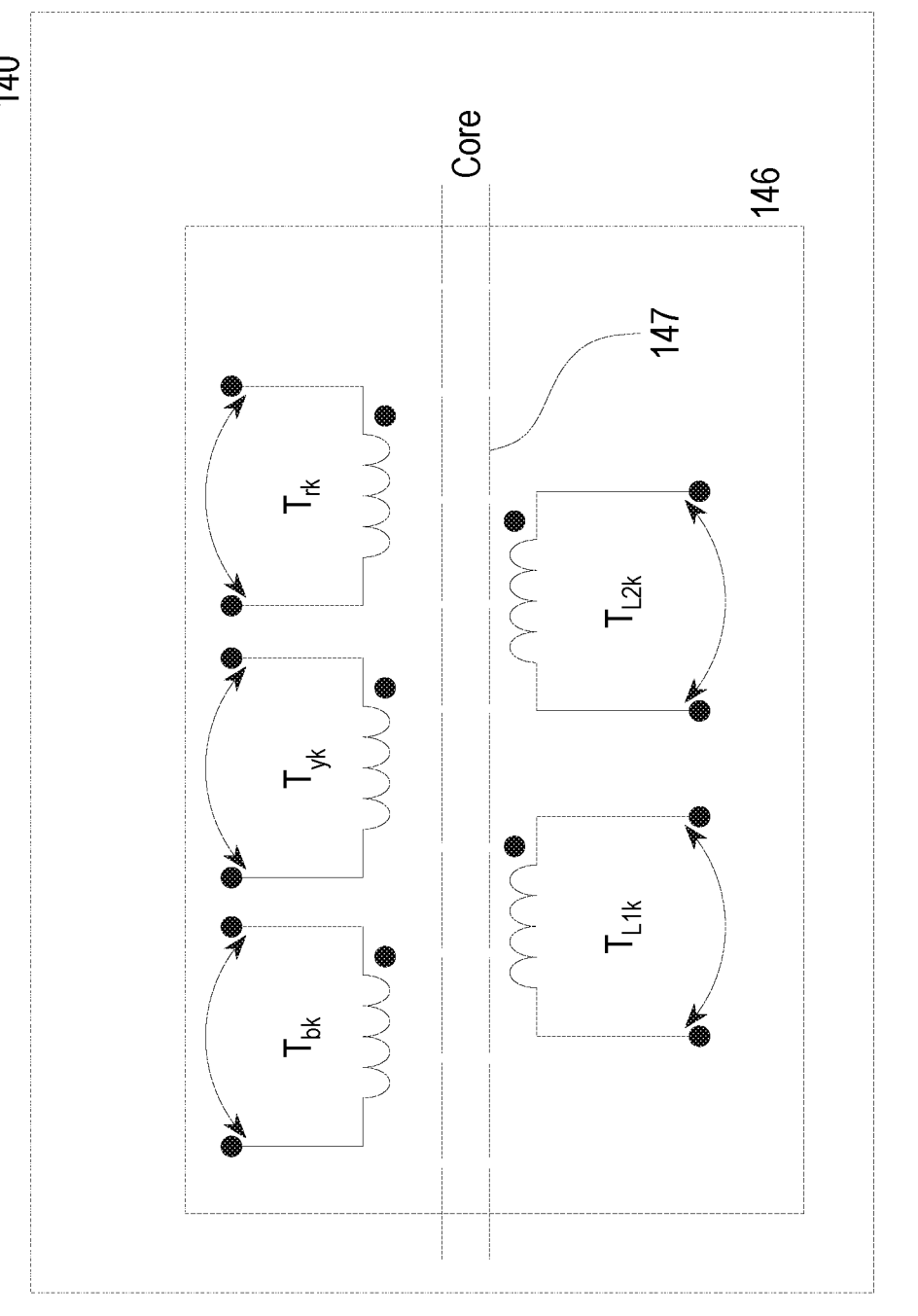
FIG. 7 illustrates a block diagram representation of transformer windings in a multi-winding high frequency transformer of the power converter system of FIG. 5, in accordance with an embodiment of the present disclosure.

Since coupling between the primary and secondary windings is sufficient to ensure maximum possible power transfer in the HFTs (140). To ensure optimum coupling between the primary windings of each phase and the secondary windings, each primary endings $T_{rk}$, $T_{yk}$, $T_{bk}$ of the $k^{th}$ module is concentrically wound on the two secondary windings, TL1k, TL2k catering to the two loads (as shown in FIG. 7). In an embodiment, as shown in FIG. 7, all the phase primary windings along with the secondary windings are wound on single limb (146) of a magnetic core (147). It should be noted that the magnetic core is common to all the windings and is solidly grounded via the mechanical support structure to the chassis. Hence, the insulation requirement between core and secondary windings would be of low voltage. Similarly, insulation requirement between secondary and primary windings and between any two primary windings is also of medium voltage. However, low voltage insulation would be sufficient between secondary windings.

As explained above, each secondary winding in the multi-winding HFTs (140) is combined to generate a single HFAC voltage port, prior to feeding one or more HFAC-DC modules (150). As shown, each HFAC-DC module (150) is coupled to a corresponding secondary winding of the plurality of multi-winding HFTs (140) to generate isolated DC load ports (160). Further, since the secondary windings are all of LV insulation, they can be stacked together around the magnetic core (147), thus any number of isolated DC load ports (160) is scalable with the power converter system (100) of the present disclosure.

Figure 6B:
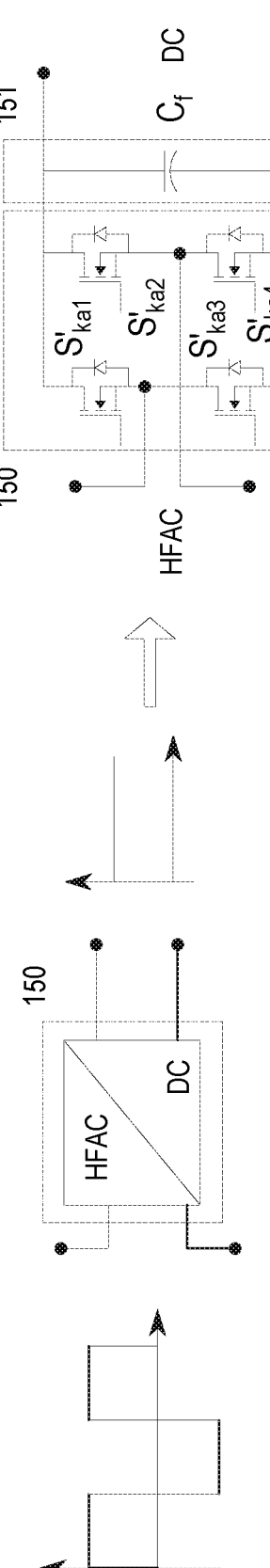
FIG. 6B illustrates a block diagram representation of internal components of a HFAC-DC module of the power converter system of FIG. 5, in accordance with an embodiment of the present disclosure.

Referring to FIG. 6B in conjunction with FIG. 5, the one or more HFAC-DC modules (150) operate based on the second switching frequency ($f_{sw2}$) for performing conversion of the HFAC voltages from the corresponding secondary winding of each of the plurality of multi-winding HFTs (140). Thus, enabling DC power transmission to the corresponding isolated DC load port (160) via a filter capacitor (151) based on the load demand associated with the corresponding isolated DC load port (160). In particular, the HFAC-DC modules (150) correspond to an H-bridge converter switching. The output load current of the secondary active bridge (or the HFAC-DC modules (150)) is filtered by the filter capacitor (151) and transmitted to the loads connected to the corresponding isolated DC load port (160) via a load resistor (161) associated with each isolated DC load port (160) that is connected in parallel to the filter capacitor (151). Similar to the AC-DC-HFAC modules (110), the HFAC-DC modules (150) (or the secondary active bridge) handles load power $P_L$.

Further, the power transmission between the primary windings to each of the secondary windings is based on the load demand associated with the corresponding isolated DC load ports (160). The power transmission between the primary windings to each of the secondary windings in the plurality of multi-winding HFTs (140) enables power balance between the plurality of AC-DC-HFAC modules (110) operatively coupled to the power source (51) while ensuring DC power transmission to the isolated DC load ports (160) as per the load demand. It is to be noted that the corresponding secondary windings of each of the plurality of multi-winding HFTs (140) are connected in parallel configuration. This enables power balance between the plurality of AC-DC-HFAC modules (110), while feeding DC power to the isolated DC load ports (160).

In an embodiment, the power flow between the primary and the secondary windings of the multi-winding HFTs (140) is controlled by a quadratic static relation ($f'(i_0)$) with respect to time delay ($\delta$) between the HFAC voltages applied to the two secondary windings. The static relation is expressed in the following equation (Eq. 6).

$$f'(i_o) = \delta^* \approx \frac{\bar{I_o}}{1.84},$$
$$-\frac{\pi}{6} < \delta^* < \frac{\pi}{6}$$

(Eq. 6)

Wherein, $\bar{I^*_o}$ it is the pre-unitized output load current reference generated by outer voltage loop, It is to be noted that the static relation indicated in (Eq. 6) is a linear approximation of quadratic relation between current and phase delay between primary and secondary windings of the dual active bridge (DAB). The AC-DC-HFAC modules (110) correspond to primary DAB and the HFAC-DC modules (150) correspond to secondary DAB. Further, the quadratic relation associated discussed above is for DAB. However, the approximation may be applicable for only $\delta^* < \pi/6$. For example, 1.84 may be the optimum scaling factor which provides better interpolation of the quadratic static relation in the domain of $\delta^* < \pi/6$.

Figure 8:
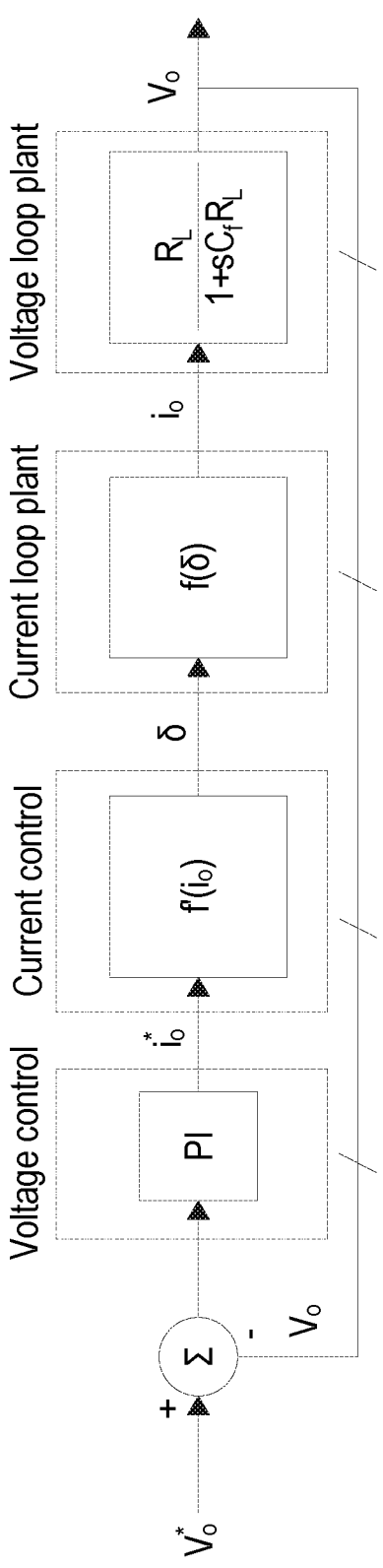
FIG. 8 illustrates a control structure of a typical outer voltage and inner current loop in a dual-active bridge (DAB) associated with the power converter system of FIG. 5, in accordance with an embodiment of the present disclosure.

Referring to FIG. 8, a control structure of the typical two winding DAB consisting of outer voltage and inner current loop of conventional system is shown. The control structure includes a voltage loop to regulate the output voltage from the HFAC-DC modules (150). The resistance $R_L$ is the equivalent load impedance on the DC port. However, as explained above, since three primary windings and multiple secondary windings are wound on the same core coupled with one another, the control structure should consider the power flow amongst the primary windings and the secondary windings.

Figure 9:
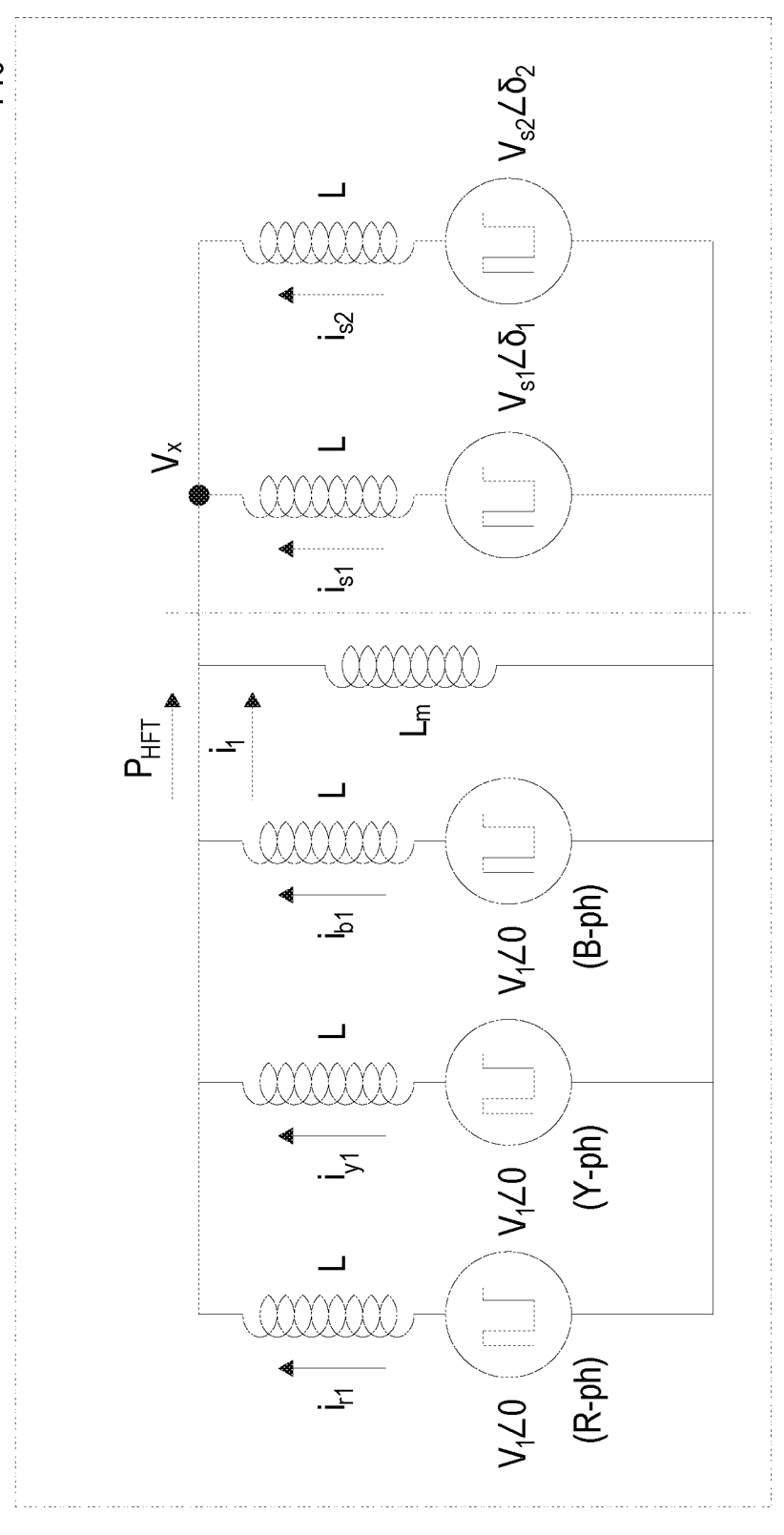
FIG. 9 illustrates a block diagram representation of an equivalent circuit of the multi-winding high frequency transformer of the power converter system of FIG. 5, in accordance with an embodiment of the present disclosure.

Referring to FIG. 9 in conjunction with FIG. 8, an equivalent circuit of a multi-winding HFT (e.g., the multi-winding HFT (140)) is illustrated. As explained above, in the embodiment, for any given level of CHB converter (i.e., the power converter system (100)), the three AC-DC-HFAC modules (110) generate equal HFAC voltages with no phase difference (or constant phase difference). Thus, no power transfer is expected between the three primary windings of the multi-winding HFT (140). Further, since all the windings are tightly wound in a concentric manner, the leakage or power transfer inductance, is distributed equally on both the primary and secondary windings is considered which is indicated as leakage inductance (L). The corresponding magnetizing inductance Lm of the transformer is indicated in FIG. 9. However, due to different power demands on each DC load port, each load secondary of the HFTs (140) generating the HFAC voltage includes phase difference with respect to other secondaries. Since all the secondary windings are wound on same core, power flow between secondary windings of the HFTs (140) through the HFAC-DC modules (150) of the corresponding isolated DC load ports (160) are also considered for plant modelling.

In one scenario of the embodiment, if the power demand on all the isolated DC load ports (160) are identical, power transfer amongst secondary windings is negligible. However, for a practical operating scenario of the embodiment, the control structure on each isolated DC load port (160) only accommodates power transfer from the three primary windings to the secondary windings in the HFTs (140), hence the static relation shown expressed in the equation (Eq. 6) is not applicable for multi-active bridge of the power converter system (100).

Figure 10:
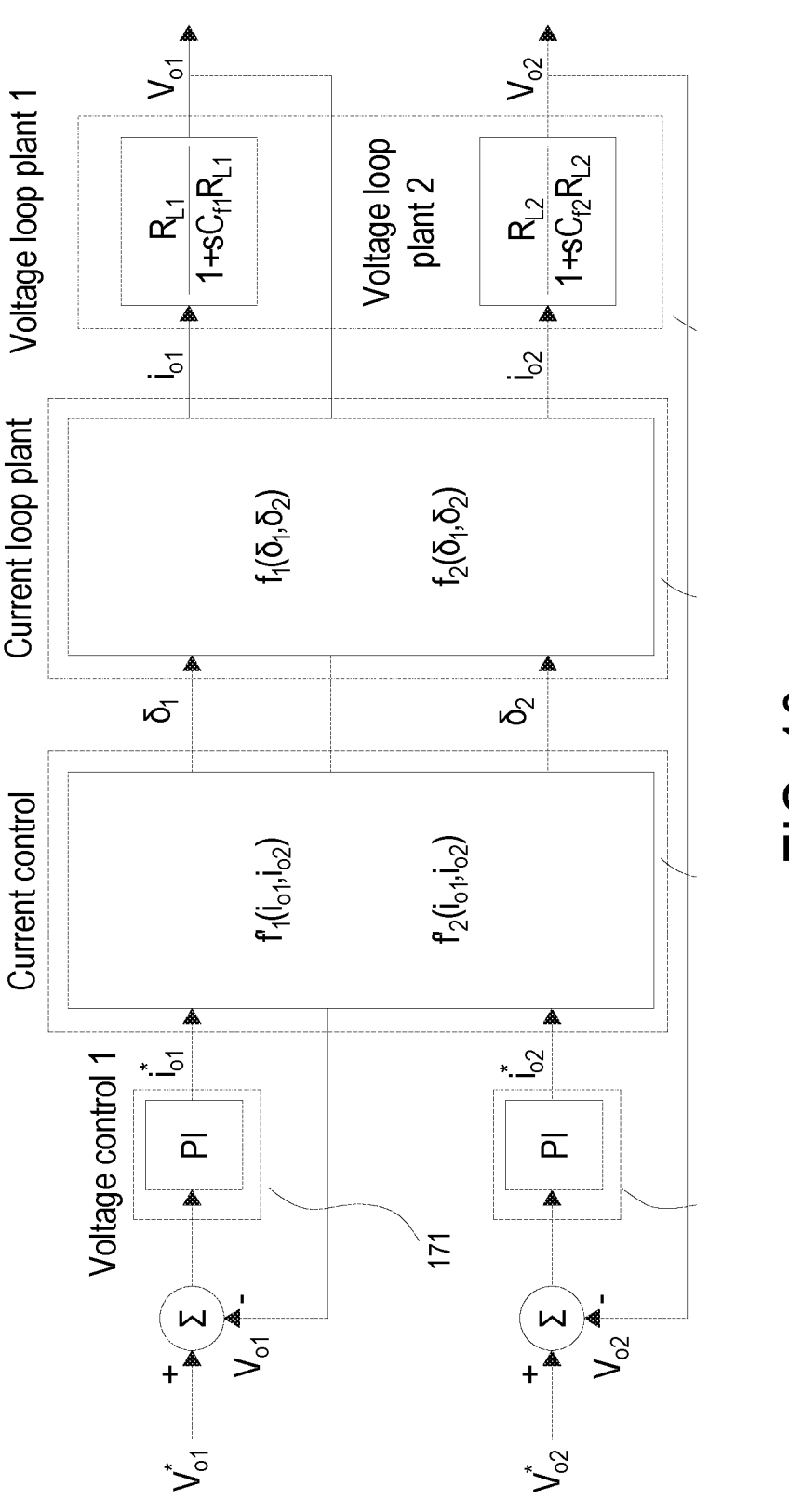
FIG. 10 illustrates a block diagram representation of a control structure of a multi active bridge (MAB) indicating two loop structures, in accordance with an embodiment of the present disclosure.

Referring to FIG. 10, is a control structure of the power converter system (100). It is to be noted that, for obtaining the static relation for any generic $k^{th}$ isolated DC load port, to accommodate power transfer between the secondary windings $\delta_k^*$ and $\bar{I^*_{ok}}$ and are considered as a function of all load currents. The load currents are expressed using the following equation (Eq. 7).

$$f'_m(i_{o1}, i_{o2} \ldots i_{onL}) = \delta_k^* = \frac{\bar{I^*_{ok}} + \sum_{m=1}^{n_L} \frac{\bar{I_{om}}}{s}}{1.84(n_L + 3)},$$
$$k \in [0, n_L],$$
$$-\frac{\pi}{6} < \delta_k^* < \frac{\pi}{6}$$

(Eq. 7)

Wherein, $\delta_k^*$ indicates $k^{th}$ load port's pre-unitized phase delay with respect to primary windings, and $\bar{I^*_{ok}}$ indicates output current reference for $k^{th}$ load port.

Therefore, combining the secondary windings (or paralleling the secondary windings) ensures each CHB module (or the AC-DC power converters (120)) to equally provide power to a given load port. Thus, for power differences between the isolated DC load ports (160), there is no power imbalance between the AC-DC-HFAC modules (110) (in particular, the AC-DC power converters (120)) in a given phase. This allows for complete swing in the isolated DC ports and the load powers from 0 to 1 p.u. The three-phase imbalance is also circumvented by ensuring tight coupling between each primary and secondary windings and by combining primary windings of three-phases DC-HFAC converter (130) on a common magnetic core. Since all CHB modules in a phase contribute equal power to a load port, the control of $k^{th}$ level's DC-HFAC converter (130), the HFTs (140) and the HFAC-DC modules (150) can be extended to all the 'ne' modules respective units.

Figure 11A:
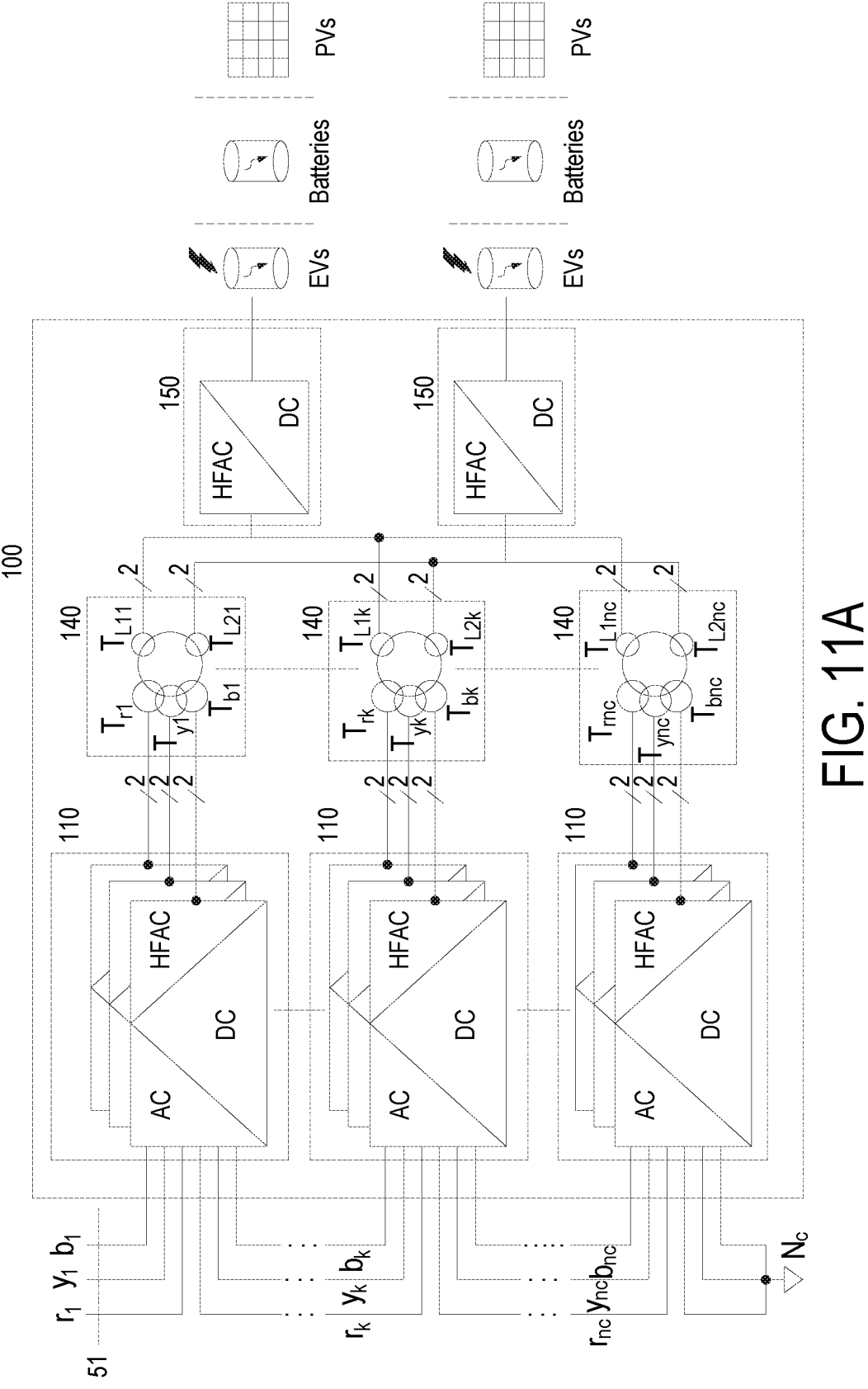
FIGS. 11A, 11B, 11C, 11D, and 11E illustrate a block diagram representation of the power converter system of FIG. 5 implemented in various applications, in accordance with an embodiment of the present disclosure.

In an embodiment, the power converter system (100) is configured to provide DC power supply from the power source (51) (i.e., the MVAC power grid) to DC microgrids (as shown in FIG. 11A). The DC microgrids are coupled to the corresponding isolated DC load ports (160) (as shown in FIG. 11A). The DC microgrids includes multiple DC loads and sources such as, but not limited to, Electric vehicles (EVs), batteries, and photovoltaic (PV) panels/arrangements (as shown in FIG. 11A).

Figure 11B:
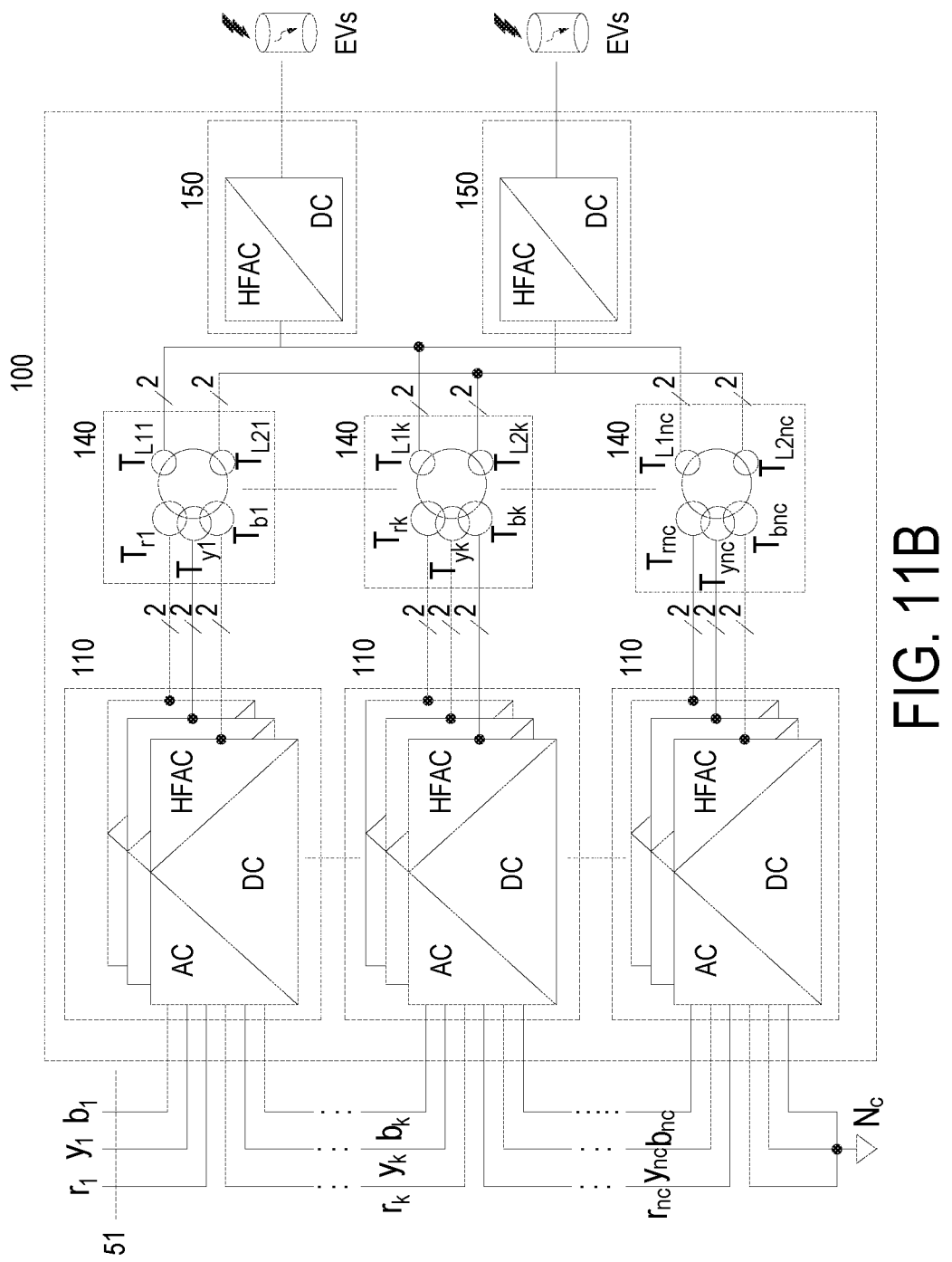

In an embodiment, the power converter system (100) may be used in high power EV charging stations for bus charger applications where each isolated DC port caters to an electric bus (as shown in FIG. 11B).

Figure 11C:
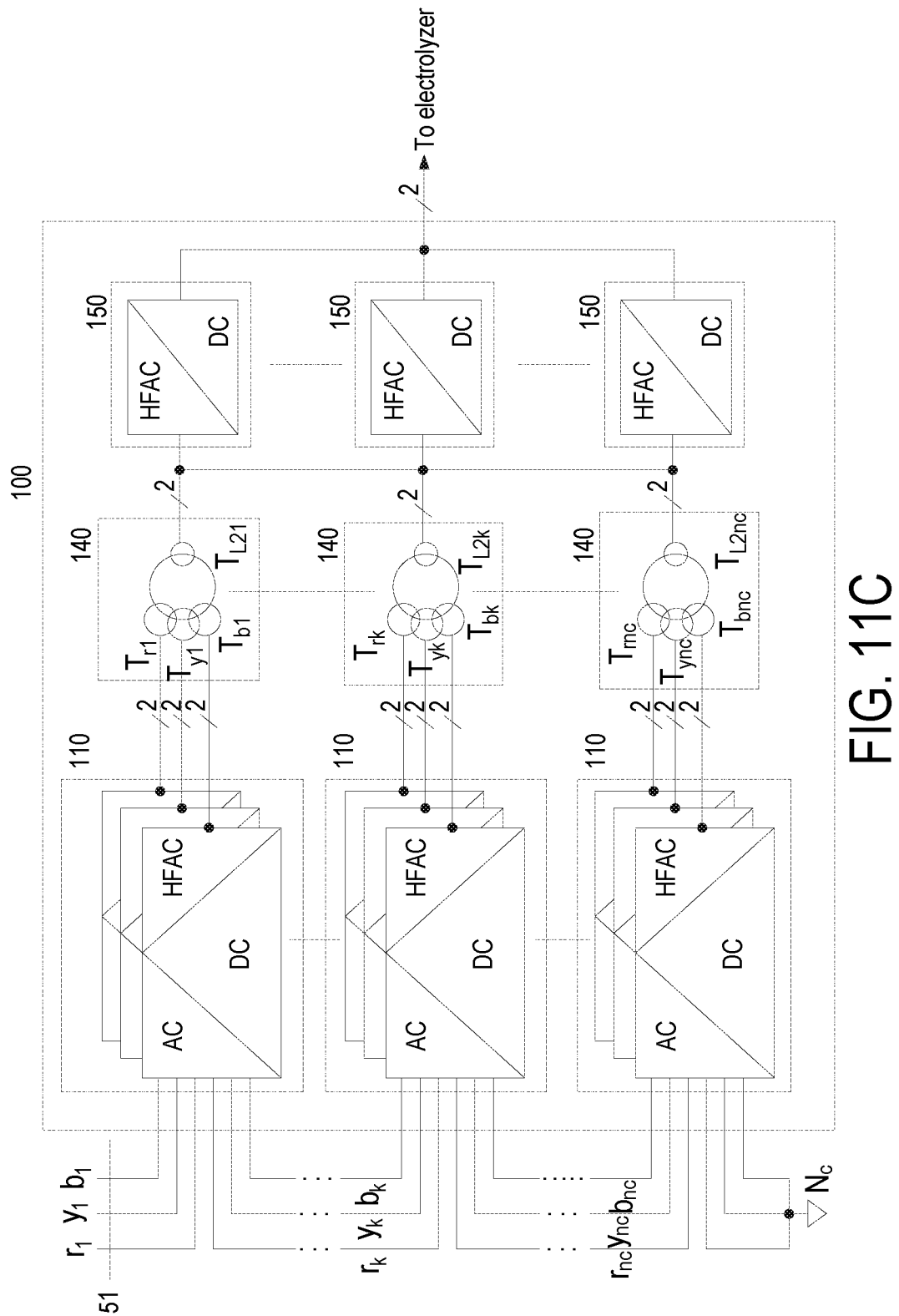

In an embodiment, the power converter system (100) may be used for electrolyzer applications (as shown in FIG. 11C). In this application, the HFAC-DC modules (150) are connected in the parallel configuration (as shown in FIG. 11C). Specifically, the power converter system (100) is implemented for the electrolyzer applications with low DC voltage and high current requirement where each HFT (140) may include a single secondary winding catering to a single load which is electrolyzer.

Figure 11D:
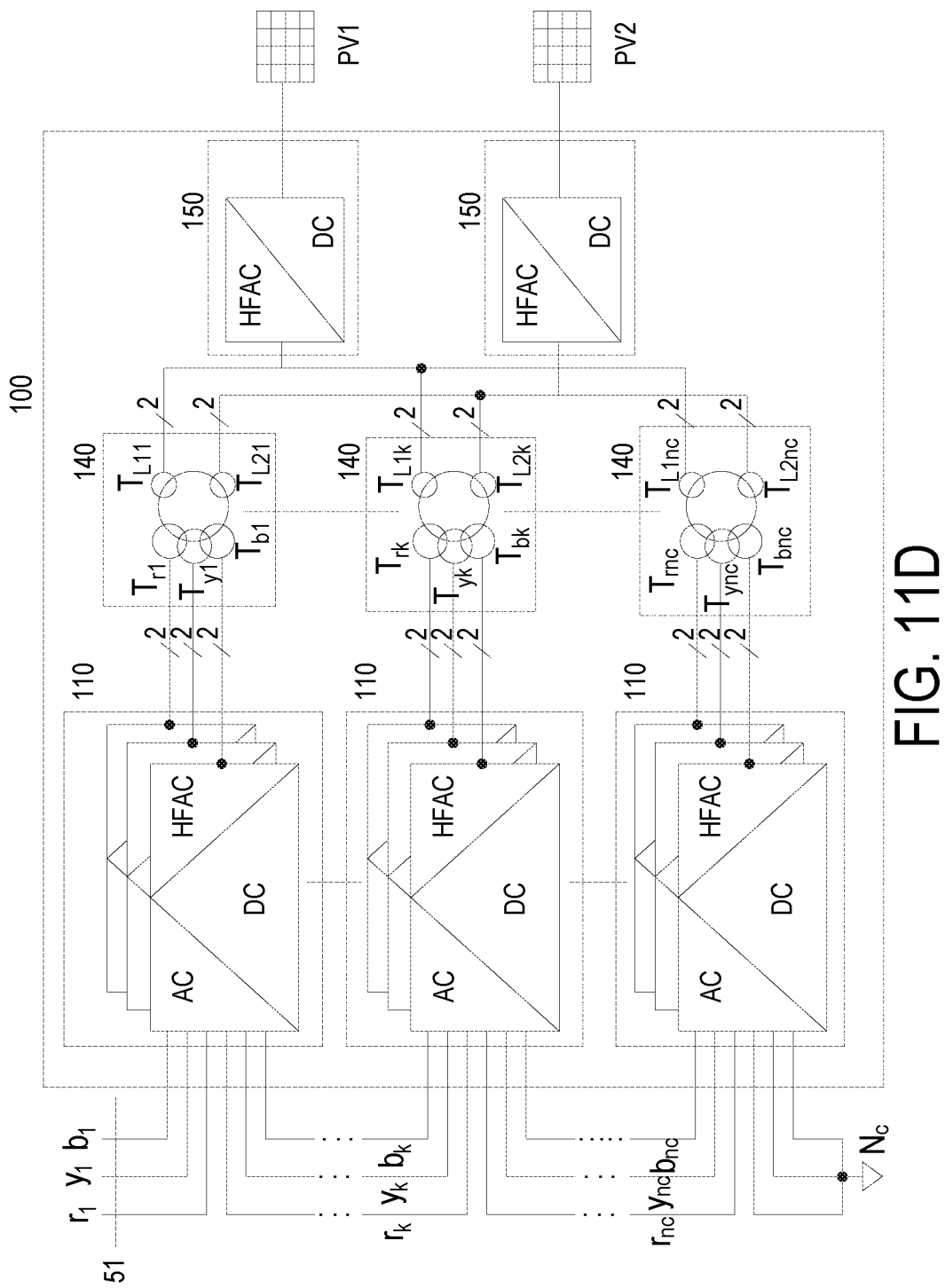

In an embodiment, the power converter system (100) may be used for solar PV applications for distributed solar power generation (as shown in FIG. 11D).

Figure 11E:
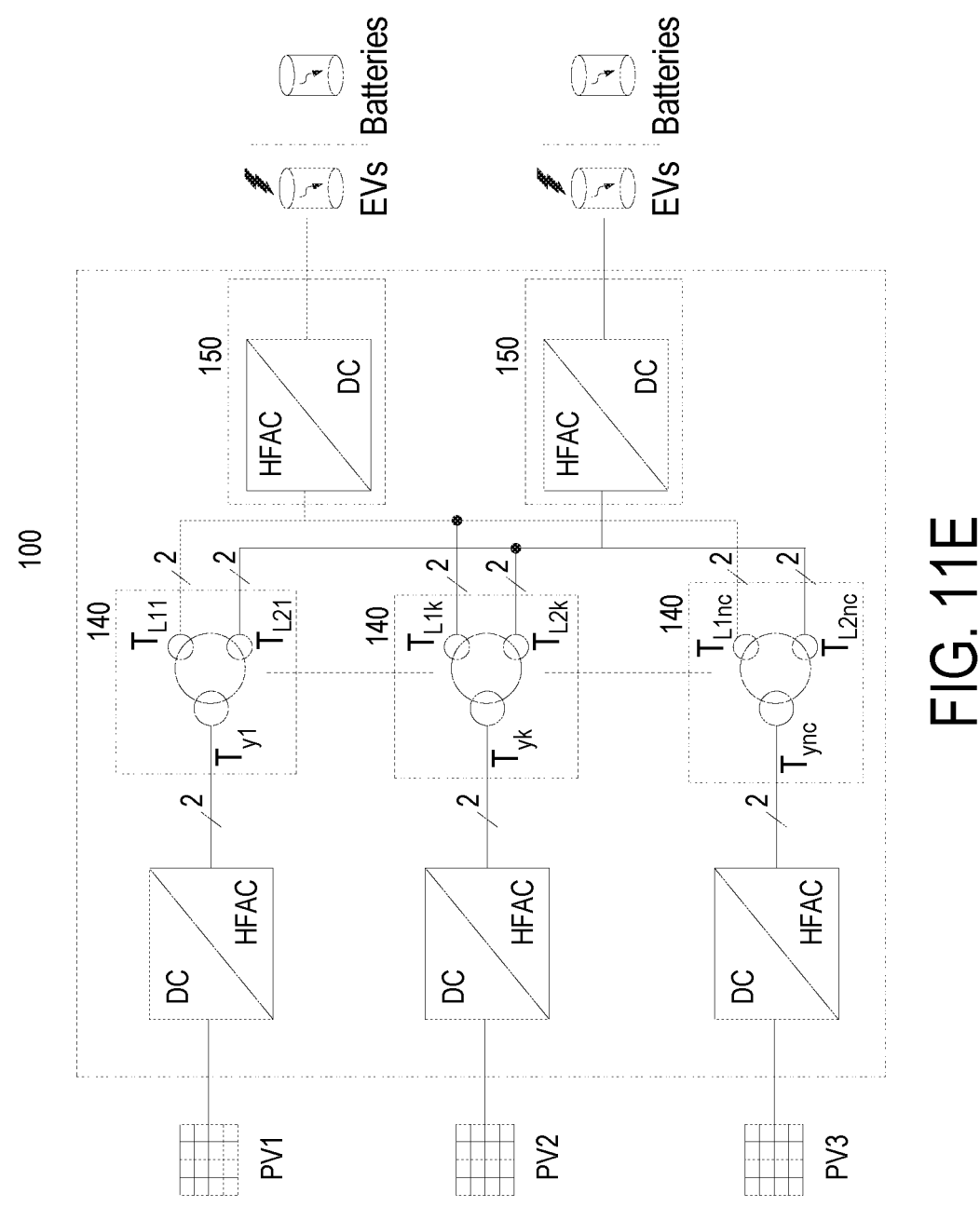

In one embodiment, the power converter system (100) may be used to transfer power in islanded microgrid solutions where distributed solar power generation can cater to local DC loads/sources such as EVs and battery banks (as shown in FIG. 11E).

In an advantageous aspect of the present disclosure, the power converter system is easily scalable, simpler control, improved efficiency and improved reliability due to no-extra switching or passive components.

In another advantageous aspect of the present disclosure, power balance is achieved between MVAC power electronic converter modules of the power converter system for unequal loading of DC load ports.

In another advantageous aspect of the present disclosure, isolation of a LVDC port from other LVDC ports can be realized in the power converter system to ensure seamless operation.

In another advantageous aspect of the present disclosure, the three-phase power balance is ensured since all the three-phase HFAC primary windings cater to every load secondary winding in the multi-winding HFT.

In another advantageous aspect of the present disclosure, any number of isolated DC load ports can be generated by addition of new secondary windings on the multi-winding HFT.

The various embodiments described above are specific examples of a single broader invention. Any modifications, alterations or the equivalents of the above-mentioned embodiments pertain to the same invention as long as they are not falling beyond the scope of the invention as defined by the appended claims. It will be apparent to a skilled person that the embodiments described above are specific examples of a single broader invention which may have greater scope than any of the singular descriptions taught. There may be many alterations made in the invention without departing from the spirit and scope of the invention.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

What is claimed is:

1. A power converter system, comprising:
a plurality of alternating current (AC)-direct current (DC)-high frequency alternating current (HFAC) modules coupled to power sources respectively, wherein the plurality of AC-DC-HFAC modules are configured to generate HFAC voltages from an AC voltage received from the power source;
a plurality of multi-winding high frequency transformers (HFTs) comprising primary windings and secondary windings, wherein the plurality of multi-winding HFTs are insulated with optimum graded insulation and are adapted to receive the HFAC voltages from the plurality of AC-DC-HFAC modules, wherein each secondary winding of the plurality of multi-winding HFTs coupled to the plurality of AC-DC-HFAC modules generates an HFAC voltage port; and
one or more HFAC-DC modules, each of the one or more HFAC-DC modules coupled to a corresponding secondary winding of the plurality of multi-winding HFTs, thereby generating isolated DC load ports,
wherein the plurality of multi-winding HFTs is operated based on a phase angle control technique for enabling power transmission between the primary windings to each of the secondary windings based on a load demand associated with the corresponding isolated DC load ports, thereby providing DC power supply to loads connected to the isolated DC load ports via the corresponding HFAC-DC modules of the one or more HFAC-DC modules.

2. The power converter system as claimed in claim 1, wherein the power transmission between the primary windings to each of the secondary windings in the plurality of multi-winding HFTs enables power balance between the plurality of AC-DC-HFAC modules operatively coupled to the power source while ensuring DC power transmission to the isolated DC load ports as per the load demand.

3. The power converter system as claimed in claim 2, wherein the corresponding secondary windings of each of the plurality of multi-winding HFTs are connected in a parallel configuration, thereby enabling power balance between the plurality of AC-DC-HFAC modules, while feeding DC power to the isolated DC load ports.

4. The power converter system as claimed in claim 3, wherein the secondary windings connected in the parallel configuration prevents interruption in the power supply to the isolated DC load ports.

5. The power converter system as claimed in claim 1, wherein each of the plurality of AC-DC-HFAC modules comprises:

an AC-DC power converter configured to operate based on a first switching frequency to regulate DC voltage from the AC voltage received from the power source, wherein the AC-DC power converter of each of the plurality of AC-DC-HFAC modules is coupled in a series configuration and connected to the power source; and a DC-HFAC converter configured to operate based on a second switching frequency for generating the HFAC voltage from the regulated DC voltage received from the AC-DC power converter via a DC bus capacitance.

6. The power converter system as claimed in claim 5, wherein the second switching frequency is greater than the first switching frequency due to multi-level operation associated with the power converter system.

7. The power converter system as claimed in claim 5, wherein the DC-HFAC converter operates based on the second switching frequency for generating the HFAC voltages from the regulated DC voltage.

8. The power converter system as claimed in claim 7, wherein the HFAC voltages have constant phase difference.

9. The power converter system as claimed in claim 7, wherein the HFAC voltages are equal with no phase difference.

10. The power converter system as claimed in claim 1, wherein the one or more HFAC-DC modules operate based on a second switching frequency for performing conversion of the HFAC voltages from the corresponding secondary winding of each of the plurality of multi-winding HFTs, for enabling DC power transmission to the corresponding isolated DC load port via a filter capacitor based on the load demand associated with the corresponding isolated DC load port.

11. The power converter system as claimed in claim 1, wherein the power converter system comprises a star-connected medium voltage power converter system.

12. The power converter system as claimed in claim 1, wherein a number of isolated DC load ports is directly proportional to a number of secondary windings in the plurality of multi-winding HFTs.

13. The power converter system as claimed in claim 1, wherein each of the one or more HFAC-DC modules is connected in a parallel configuration.

14. The power converter system as claimed in claim 1, wherein each of the plurality of AC-DC-HFAC modules is configured to generate HFAC voltages from the AC voltage received from the power source.

15. The power converter system as claimed in claim 1, wherein each of the plurality of multi-winding high frequency transformers comprises a plurality of primary windings and a plurality of secondary windings.

* * * * *